April 4, 1950             J. W. SMITH             2,503,138

VEHICLE WHEEL SUPPORTING TRUCK

Filed April 18, 1947

*Inventor*
John W. Smith

By *Clarence A. O'Brien and Harvey B. Jacobson*
*Attorneys*

Patented Apr. 4, 1950

2,503,138

UNITED STATES PATENT OFFICE 2,503,138

VEHICLE WHEEL SUPPORTING TRUCK

John W. Smith, Lincoln, Ark.

Application April 18, 1947, Serial No. 742,433

1 Claim. (Cl. 214—1)

This invention relates to new and useful improvements in vehicle wheel supporting trucks and the primary feature of the present invention is to provide a truck for use in the removal and replacement of heavy vehicle wheels, which can easily be operated by one person with great ease.

Another important feature of the present invention is to provide a device of the character referred to which can quickly and readily be inserted in position for use, upon a slight jacking up of the vehicle wheel.

A further feature of the present invention is to provide a truck including an anti-friction support for the truck, which guides and limits the movement of the truck.

A still further feature of the present invention is to provide a device of the class described, that is simple and practical in construction, strong and reliable in use, relatively inexpensive to manufacture, and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
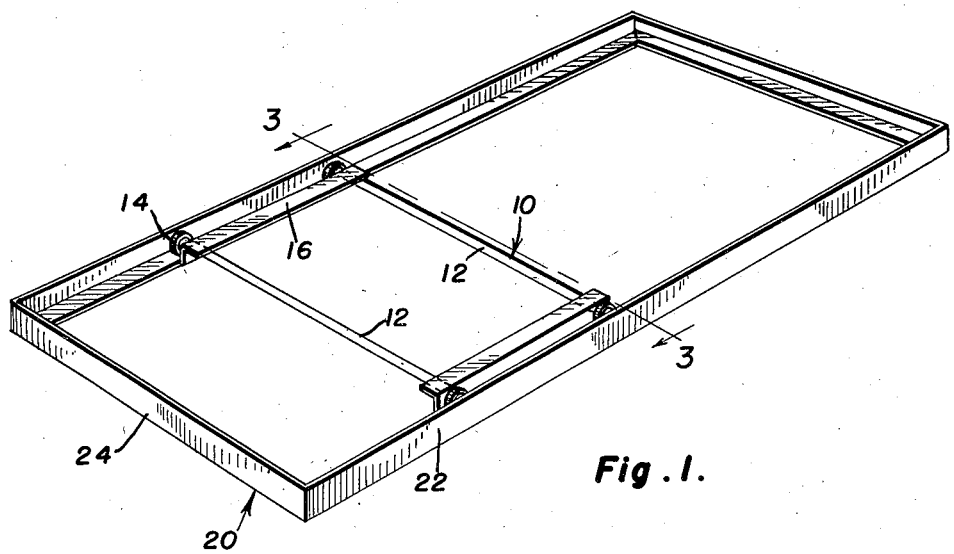
Figure 1 is a perspective view of the present invention.
Figure 2:
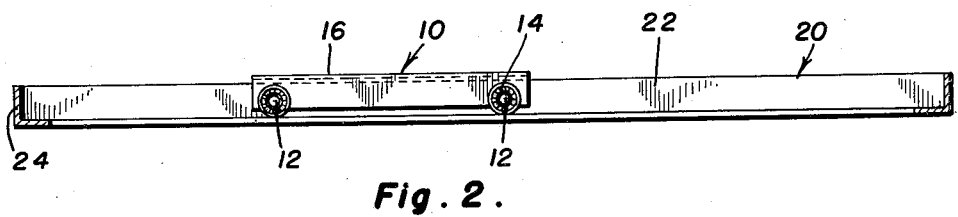
Figure 2 is a longitudinal vertical sectional view of Figure 1, with parts broken away and shown in section.
Figure 3:
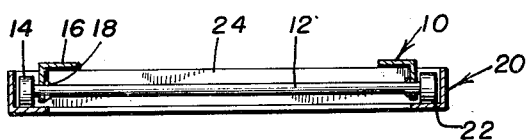
Figure 3 is a transverse vertical sectional view taken on the line 3—3 of Figure 1.

Referring now to the drawings in detail, wherein for the purpose of illustration, there is shown a preferred embodiment of the present invention, the numeral 10 represents generally the vehicle wheel supporting truck, composed of a pair of spaced parallel axles 12.

Ball bearing rollers or wheels 14 are journaled on the terminal portions of said axles, to permit movement of the axles without tipping action.

Angle iron cross pieces 16 extend transversely between axles 12 and are provided with a notch portion 18 which receives the axles and is suitably secured to the respective axles.

A substantially rectangular angle iron truck support, designated generally by the numeral 20, is composed of parallel sides 22 and parallel ends 24.

Wheels 14 are adapted to bear on the horizontal portion of the sides 22 for guiding the movement of the truck, and the ends 24 limit the movement of the truck on the support.

In use of the device, the truck is pushed to one end of the support and both truck and support are placed under the wheel of the vehicle that is to be removed. The wheel previously having been raised slightly. When the wheel is removed from the vehicle, by removing the attaching bolts holding the same relative to the vehicle, and pulling the wheel outwardly from the vehicle, the wheel extends between the axles 12 and bears upon the cross pieces 16.

The wheel and frame 10 are then pulled forwardly on the support, outwardly from the vehicle, for accessibility to the vehicle axles or the wheel.

To replace the wheel the previously described procedure is reversed.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A wheel removing device comprising a flat substantially rectangular support of angle iron construction including a pair of spaced parallel longitudinal side members, and a pair of spaced parallel cross members fixed between the side members, said side members and said cross members including substantially horizontal leg portions and substantially vertical leg portions, a wheel engaging frame mounted on said support for movement and including a pair of spaced parallel, substantially horizontal wheel axles for receiving a tire therebetween, and a pair of substantially horizontal, spaced cross pieces carried by and disposed perpendicular to the axles for engaging and supporting a tire received between said axles in a substantially vertical position, wheels at the ends of said axles received on the horizontal leg portions of the side members, the vertical leg portions of the side members forming stops for engaging the wheels to limit transverse movement of the wheel engaging frame between the side members, and the vertical leg portions of the cross members forming transverse stops for limiting the longitudinal movement of the wheel engaging frame relative to the support in both directions.

JOHN W. SMITH.

REFERENCES CITED

The following references are of record in the file of this patent:

UNITED STATES PATENTS

| Number | Name | Date |
|---|---|---|
| 1,264,770 | Brennan | Apr. 30, 1918 |
| 1,535,762 | Brejska | Apr. 28, 1925 |
| 1,555,152 | Passow | Sept. 29, 1925 |

FOREIGN PATENTS

| Number | Country | Date |
|---|---|---|
| 417,300 | Germany | Aug. 20, 1925 |